United States Patent
Prams et al.

(10) Patent No.: US 8,212,993 B2
(45) Date of Patent: Jul. 3, 2012

(54) METHOD AND APPARATUS FOR SURVEYING ACTUAL MEASUREMENT DATA OF A COMPONENT

(75) Inventors: Matthia Prams, Raubling (DE); Michael Gandyra, Rosenheim (DE); Roman Apanovich, Kolbermoor (DE)

(73) Assignee: Steinbichler Optotechnik GmbH, Neubeuern (DE)

(*) Notice: Subject to any disclaimer, the term of this patent is extended or adjusted under 35 U.S.C. 154(b) by 401 days.

(21) Appl. No.: 12/220,242

(22) Filed: Jul. 23, 2008

(65) Prior Publication Data
US 2009/0063093 A1 Mar. 5, 2009

(30) Foreign Application Priority Data
Jul. 23, 2007 (DE) .......................... 10 2007 034 168

(51) Int. Cl.
*G01C 3/08* (2006.01)
(52) U.S. Cl. ...... 356/3.07; 356/3.01; 356/3.1; 356/3.15; 356/4.01

(58) Field of Classification Search .................. 356/3.07, 356/3.01–3.15, 4.01–4.1, 5.01–5.15, 6–22, 356/28, 28.5, 139.01–139.1
See application file for complete search history.

(56) References Cited

U.S. PATENT DOCUMENTS
2007/0064998 A1* 3/2007 Umeda et al. ................. 382/149
* cited by examiner

*Primary Examiner* — Thomas H. Tarcza
*Assistant Examiner* — Luke Ratcliffe
(74) *Attorney, Agent, or Firm* — Dilworth & Barrese, LLP.

(57) ABSTRACT

An improved method for surveying actual measurement data of a component, which originate from an optical scan, is characterized in that the actual measurement data (2) of the component (1) are surveyed by means of a measurement program (24) for a tactile coordinate measuring instrument, wherein the measurement program (24) generates a virtual measuring stylus of a virtual coordinate measuring instrument, which surveys the actual measurement data of the component.

20 Claims, 6 Drawing Sheets

METHOD AND APPARATUS FOR SURVEYING ACTUAL MEASUREMENT DATA OF A COMPONENT

BACKGROUND OF THE INVENTION

This invention relates to a method for surveying actual measurement data of a component and an apparatus for performing such method.

The method and the apparatus of the invention can in particular be used for checking components. For checking components, various methods are known already.

In a conventional and widely used method for surveying, inspecting and checking components, a physical component is examined by means of a coordinate measuring instrument, wherein this examination mostly is performed automatically. The physical component is probed in a tactile way by a measuring stylus, the actual measurement data are obtained, and the deviations from the scheduled data are detected. Such tactile measuring instruments are widely used in particular in the industry. When surveying a component with a tactile coordinate measuring instrument, which can also be referred to as coordinate measuring machine, only few interesting measurement points of the surface of the component or of the object to be examined usually are approached and the corresponding measurement data are obtained, for instance a hole diameter or a hole position, certain functional dimensions, certain distances and the like. Since the tactile survey is relatively time-consuming, it is common practice not to survey or scan the entire component or object, but only those parts or individual dimensions of the component which are of particular interest.

Another known method consists in optically surveying a component. According to this method, the component is optically scanned, in particular by means of an optical scanner. In the optical measurement technique, the "entire surface" of the component usually is scanned and recorded. As a result, actual measurement data of the component are obtained. The data record of the actual measurement data forms a virtual image of the physical component in the form of its surface points, wherein the surface points usually are recorded as 3D coordinates. This data record of the actual measurement data, i.e. the virtual component, can be visualized on a screen. Furthermore, the data record of the actual measurement data can be processed or edited. By means of special evaluation software, so-called inspection software, the actual measurement data can be surveyed. As a result, certain dimensions of the virtual component can be determined. These dimensions are based on the actual measurement data, from which the virtual component is formed. They can be compared with the scheduled data of the respective dimension. In this way, all dimensions which can be "scanned" in a tactile way on the physical component can equally be determined from the data record of the actual measurement data by suitable algorithms. At present, components increasingly are also surveyed with an optical measurement technique, since the optical measurement technique meanwhile has gained ground in terms of measurement accuracy with respect to the tactile measurement technique and a 100% examination of a component can also be effected with the optical measurement technique. With the optical measurement technique a full-surface comparison of the component can also be performed. Furthermore, the optical measurement technique involves reduced measurement times.

The apparatuses and systems for the optical scanning of surfaces, which are available on the market, are based on the principle of the pure measurement of coordinates. This means that mostly point aggregates are measured. These point aggregates can be thinned out, filtered and cross-linked in a subsequent process, in order to reduce the amount of points (mostly several millions), wherein the information content is not or only slightly reduced. By using a computer and an inspection software, an inspection can then be performed on the basis of this data record. For this inspection, certain dimensions are determined from the data record of the actual measurement values, which are compared with the associated scheduled data.

From DE 199 25 462 C1, there is known a method for surveying actual measurement data of a component, which originate from an optical scan. In this method, measurement marks are applied on a three-dimensional body. In a data processing unit, a 3D scheduled data record of the surface of the three-dimensional body is stored. Between the stored scheduled data and the measured actual data a variance comparison is performed. The surface reference points defined in the 3D scheduled data record are transferred to the three-dimensional body, wherein these transferred reference points then represent specified positions for applying the measurement marks.

DE 43 20 485 discloses a method for surveying objects by means of a distance image camera.

From DE 10 2004 061 338 A1 a method for testing a component is known, in which the component is examined by means of a testing sensor, whose position is detected.

SUMMARY OF THE INVENTION

It is the object of the invention to suggest an improved method for surveying actual measurement data of a component and an improved apparatus for performing such method.

In accordance with the invention, this object is solved by the features herein. In a method for surveying actual measurement data of a component, which originate from an optical scan, the actual measurement data of the component are surveyed by means of a measurement program for a tactile coordinate measuring instrument, wherein the measurement program generates a virtual measuring stylus of a virtual coordinate measuring instrument, which surveys the actual measurement data of the component. The actual measurement data originate from an optical scan. They can be stored and be retrieved from a memory for surveying the same. It is, however, also possible to obtain and survey the actual measurement data of the component by an optical scan.

For surveying these actual measurement data of the component, a measurement program for a coordinate measuring instrument is used. In particular, measurement programs for tactile coordinate measuring instruments can be used, which have already been created. By means of the invention, it is possible to utilize measurement programs for tactile coordinate measuring instruments for an optical measurement technique and apply the same to the actual measurement data, which were obtained by an optical scan. As a final result, a measurement program for a tactile coordinate measuring instrument, in particular a well-tried measurement program for a tactile coordinate measuring instrument, can be performed without having to use this coordinate measuring instrument itself. In this way, the advantages of the tactile measurement technique and of the optical measurement technique are combined: The full surface of the component is optically scanned in a relatively short time, and the actual measurement data generated thereby are surveyed by a measurement program for a coordinate measuring instrument, in particular by an existing, well-tried measurement program for a coordinate measuring instrument, without having to physically use for this purpose the relatively slow coordinate measuring instrument.

The actual measurement data in accordance with the invention are the actual measurement data of a component, which were obtained by an optical scan, or actual data derived from such actual measurement data. An optical scan in accordance with the invention also is understood to be a radiometric scan and some other scan which provides for a full-surface scan of the component. The measurement program of the tactile coordinate measuring instrument in particular exists in the form of a software.

Advantageous developments are also described herein.

As explained already, the actual measurement data of the component can be retrieved from a memory. The actual measurement data of the component can, however also be obtained by an optical scan. In this case, a method for checking a component can be performed, in which the actual measurement data of the component are obtained by an optical scan and in which these actual data are surveyed by means of a measurement program for a coordinate measuring instrument.

Another advantageous development is characterized in that the actual measurement data are present or obtained as an aggregate of points, as cross-linked Cartesian points and/or as scan lines.

The actual measurement data can be surveyed interactively.

It is, however, also possible to automatically survey the actual measurement data.

The actual measurement data can be surveyed by means of a standardized data format. In particular, the actual measurement data can automatically be surveyed by means of a standardized data format.

In accordance with another advantageous development, the measurement results are output or displayed on a screen. Instead or in addition, however, the measurement results can also be output into a file, in particular for further processing.

Advantageously, the measurement results are compared with scheduled data. The comparison results can be output and/or displayed or represented in the form of a table and/or graphically. It is possible to output or display the comparison results on a screen and/or output the same into a file, in particular for further processing.

An inventive apparatus for surveying actual measurement data of a component comprises an optical scanning device for obtaining the actual measurement data of the component and a data processing unit, in particular a PC or some other computer, which includes a measurement program of a tactile coordinate measuring instrument for surveying these actual measurement data.

The optical scanning device preferably is a scanner. The scanner can be a hand-held or hand-guided scanner.

Another advantageous development is characterized in that the data processing unit includes a comparison program for comparing the results of the measurement program with scheduled data.

In accordance with another advantageous development, a screen is provided for outputting or displaying the measurement results of the measurement program and/or the comparison results of the comparison program.

BRIEF DESCRIPTION OF THE DRAWINGS

Embodiments of the invention and prior art methods and apparatuses will be explained in detail with reference to the attached drawing, in which.

DESCRIPTION OF THE PREFERRED EMBODIMENTS

Figure 1:
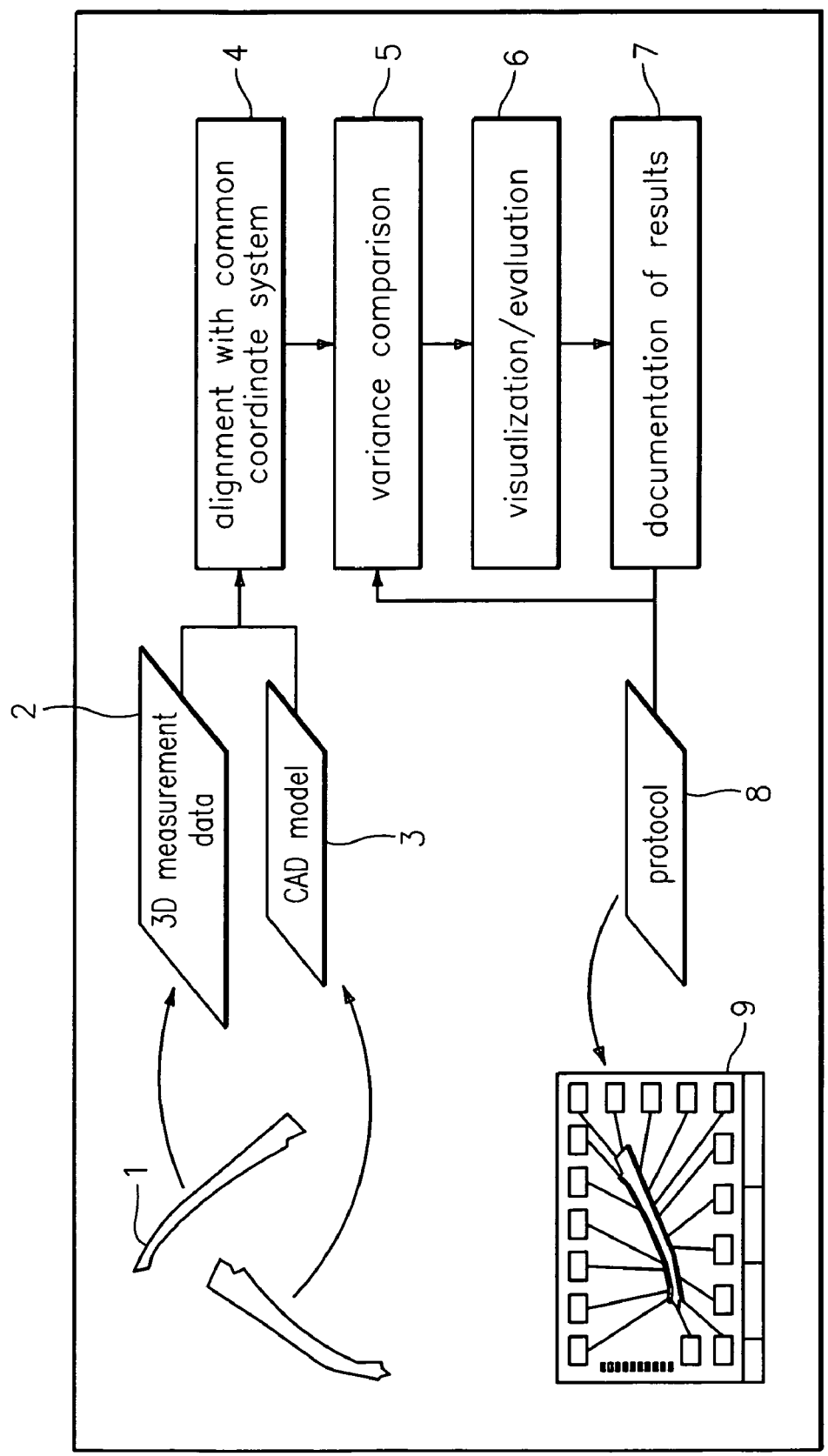
FIG. 1 shows the procedure of a component inspection by an optical measuring instrument.

FIG. 1 shows the known procedure of a component inspection by a known optical measuring instrument in a schematic representation. The component 1, which is a sheet-metal part of a motor vehicle, is optically scanned by means of a hand-held scanner (not shown in the drawing). In this way, the actual measurement data of this component 1 are obtained. They are stored in a computer as 3D measurement data 2. The actual measurement data form an aggregate of points, which can be thinned out, filtered and cross-linked in a subsequent process, in order to reduce the amount of points (mostly several millions).

The scheduled data of the component furthermore are stored in the computer as a CAD model 3.

By the prior art method of FIG. 1, the 3D measurement data 2 and the CAD model 3 are aligned with a common coordinate system in a step 4. In step 5, a variance comparison is performed, in which the 3D measurement data 2, i.e. the actual measurement data, are compared with the CAD model 3, i.e. the scheduled data. In step 6, the results are visualized and evaluated. In step 7, the results are documented. The result is recorded in a protocol 8. The protocol 8 can then be output on a screen as an image 9.

Figure 2:
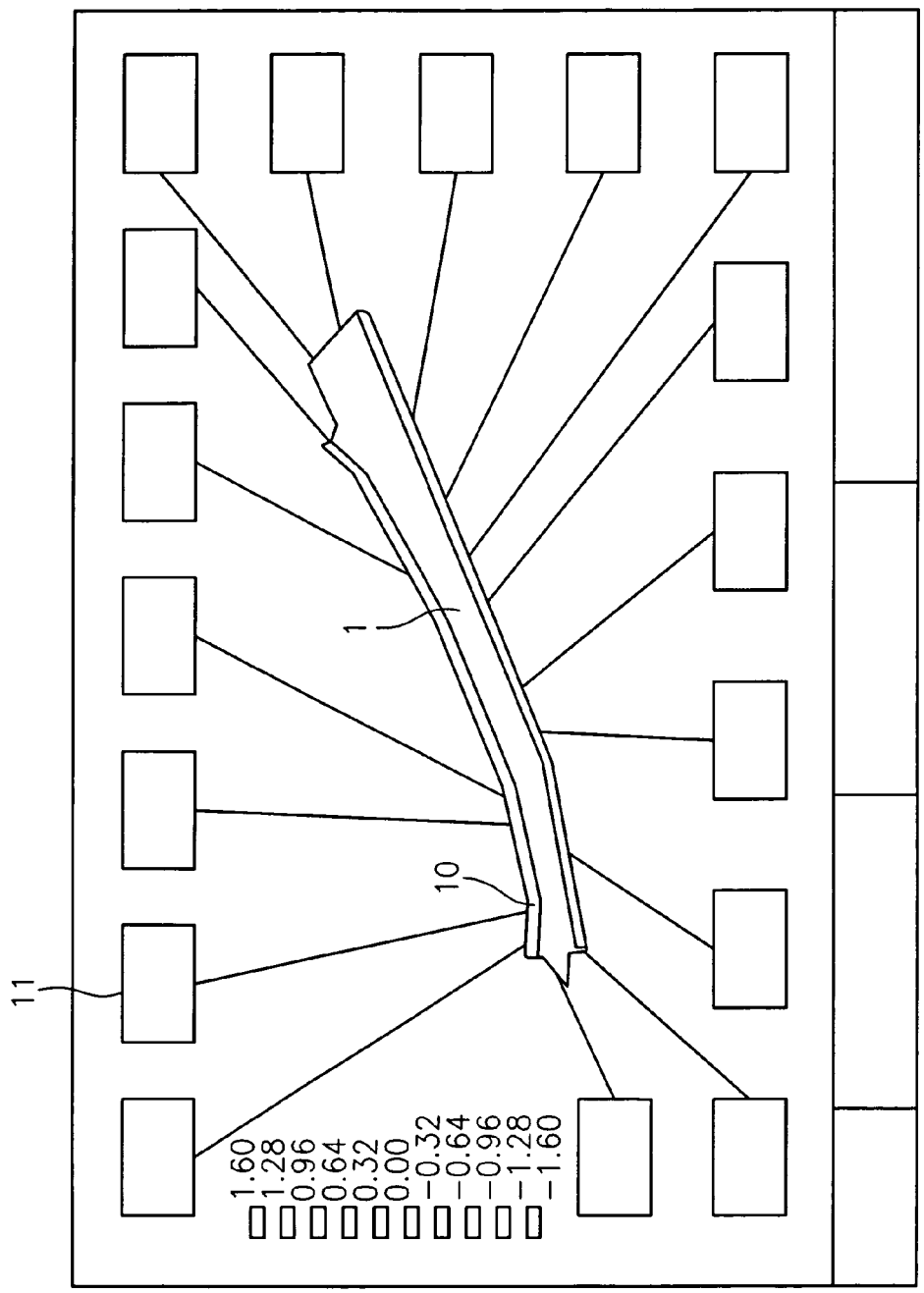
FIG. 2 shows a measurement protocol obtained by the method of FIG. 1.

FIG. 2 shows an enlarged representation of the image 9 of FIG. 1, where the values for various parts of the component 1 are output. For instance, in the left-hand upper terminal region of the component 1 a hole 10 is located, whose position is defined by three spatial coordinates. In the display field 11, the deviations of the actual coordinates from the desired coordinates are shown, namely both for the horizontal x-coordinate, the horizontal y-coordinate and the vertical z-coordinate. The same data are obtained for the further interesting points of the component 1.

FIG. 3 shows various known coordinate measuring instruments in perspective representations.

Figure 3A:
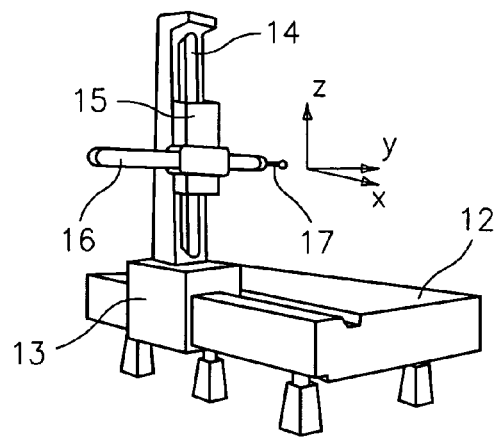
FIG. 3 shows various coordinate measuring instruments in perspective representations.

FIG. 3a shows a coordinate measuring instrument of the cantilever type. On a measuring table 12, a unit 13 can be moved in x-direction. The unit 13 comprises a vertical guideway 14, along which a carriage 15 can be moved in vertical z-direction. On the carriage 15, a guide rod 16 is movable in horizontal y-direction, which extends at right angles to the horizontal x-direction. At the end of the guide rod 16 a measuring stylus 17 with a measuring tip is disposed.

Figure 3B:
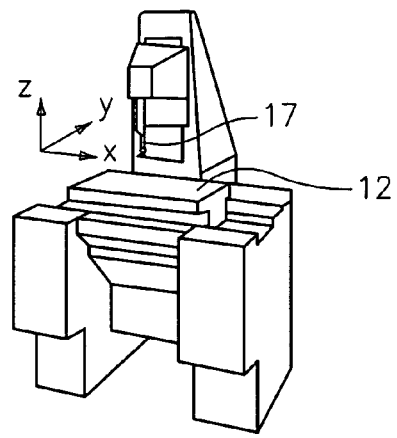

FIG. 3b shows a coordinate measuring instrument of the column type, in which the measuring stylus 17 likewise is movable in x-, y- and z-direction above a measuring table 12.

Figure 3C:
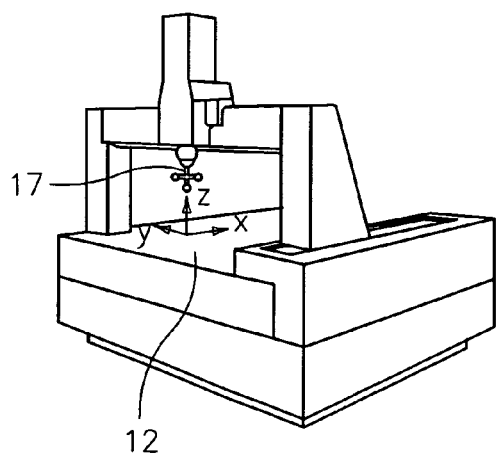

FIG. 3c shows a coordinate measuring instrument of the portal type. Here as well, the measuring stylus 17 is movable in all three directions in space above the measuring table 12.

Figure 3D:
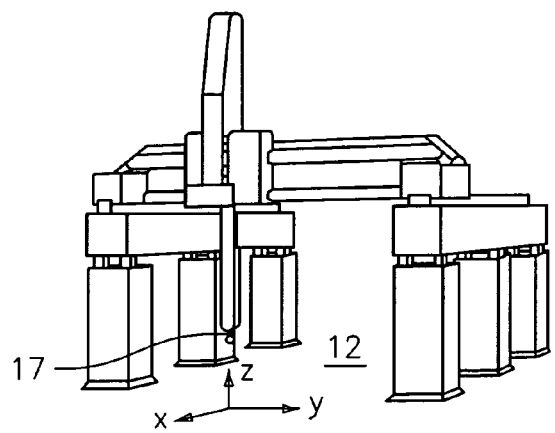

FIG. 3d shows a coordinate measuring instrument of the bridge type. The measuring stylus 17 is movable in all three directions in space above the plane forming the measuring table 12.

Figure 4:
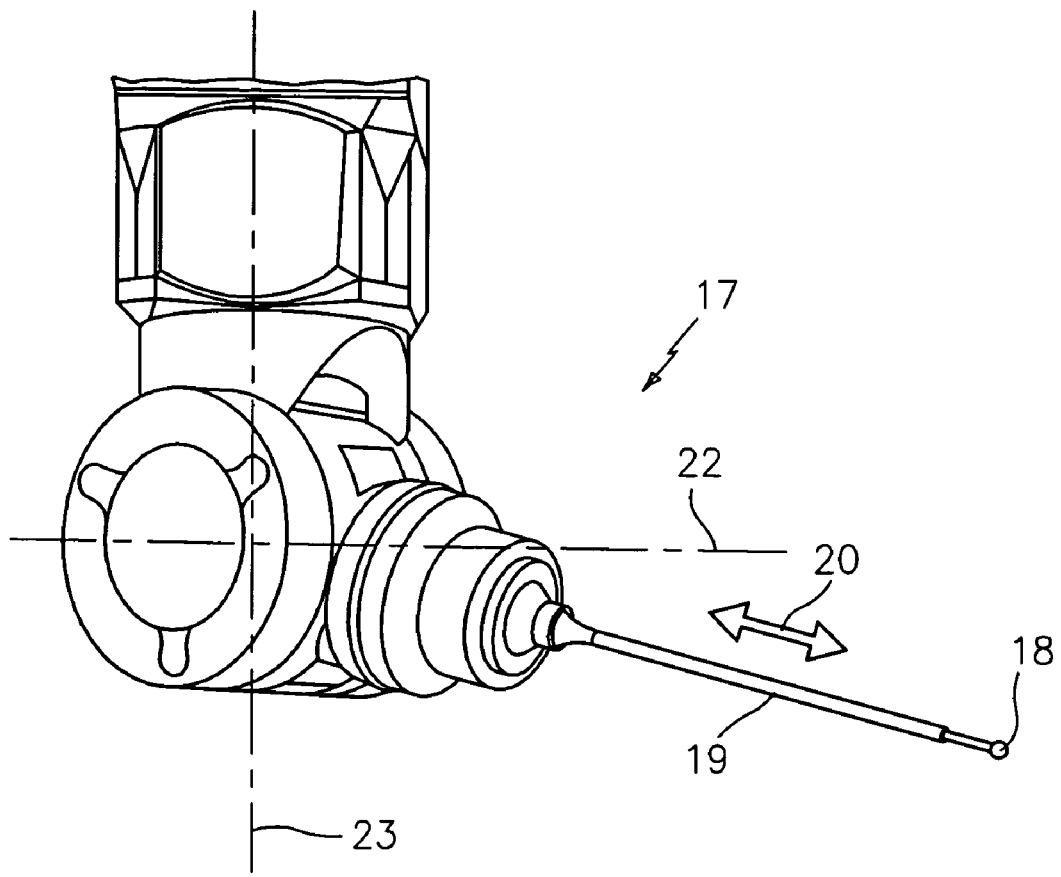
FIG. 4 shows the measuring stylus of a coordinate measuring instrument as shown in FIG. 3.

FIG. 4 shows the measuring stylus 17 in an enlarged representation. It includes a measuring tip 18, which is formed by the surface of a small sphere. The measuring tip 18 is located at the end of a telescopic rod 19, which is movable in the direction of the double arrow 20. The telescopic rod 19 is mounted in a seat 21, which can be swivelled about a horizontal axis 22. The horizontal axis 22 in turn can be swivelled about a vertical axis 23.

In the conventional and widely used process of surveying, inspecting and checking a component with a coordinate measuring instrument as shown in FIG. 3, a physical component is scanned in a tactile way, mostly automatically, with a measuring stylus 17, the actual measurement values are obtained and the deviations from the desired values are obtained in the sense of the quality assurance or a component inspection. In the process, only few interesting measurement points of the object surface are approached, and the corresponding measurement values, e.g. hole diameter, hole position, certain functional dimensions, distances etc. are determined, but not the entire component is scanned.

Figure 5:
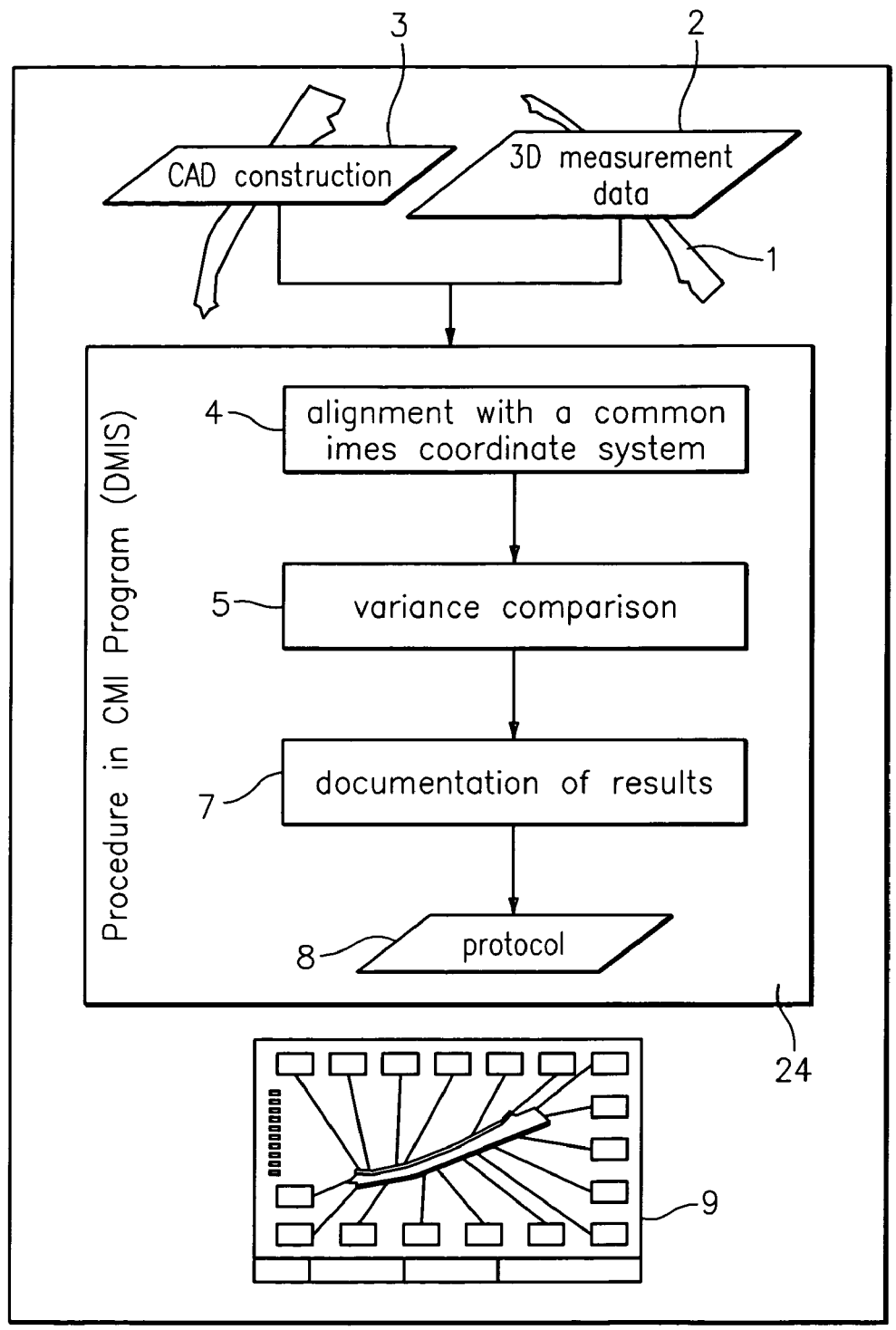
FIG. 5 shows the procedure of a survey performed by the method of the invention.

FIG. 5 shows the procedure of a measurement performed by the method of the invention. A component 1 is optically scanned, for instance by a hand-held scanner, whereby the actual measurement data of the component 1 are obtained, which are stored in a computer as 3D measurement data 2. Furthermore, the scheduled data of the component 1 are stored in the computer as CAD construction 3.

In step 4, the 3D measurement data 2 and the CAD construction 3 are aligned with a common coordinate system. In step 5 a variance comparison is performed, in which the 3D measurement data 2 are compared with the CAD construction 3. The results are documented in step 7. Of these results, a protocol 8 is created. The results are output on a screen as an image 9.

The steps 4, 5, 7 and 8 are formed by a measurement program 24 for a coordinate measuring instrument. By means of this measurement program 24, the actual measurement data of the component 1 are surveyed. The measurement results of this survey are compared with scheduled data of the component 1.

Figure 6:
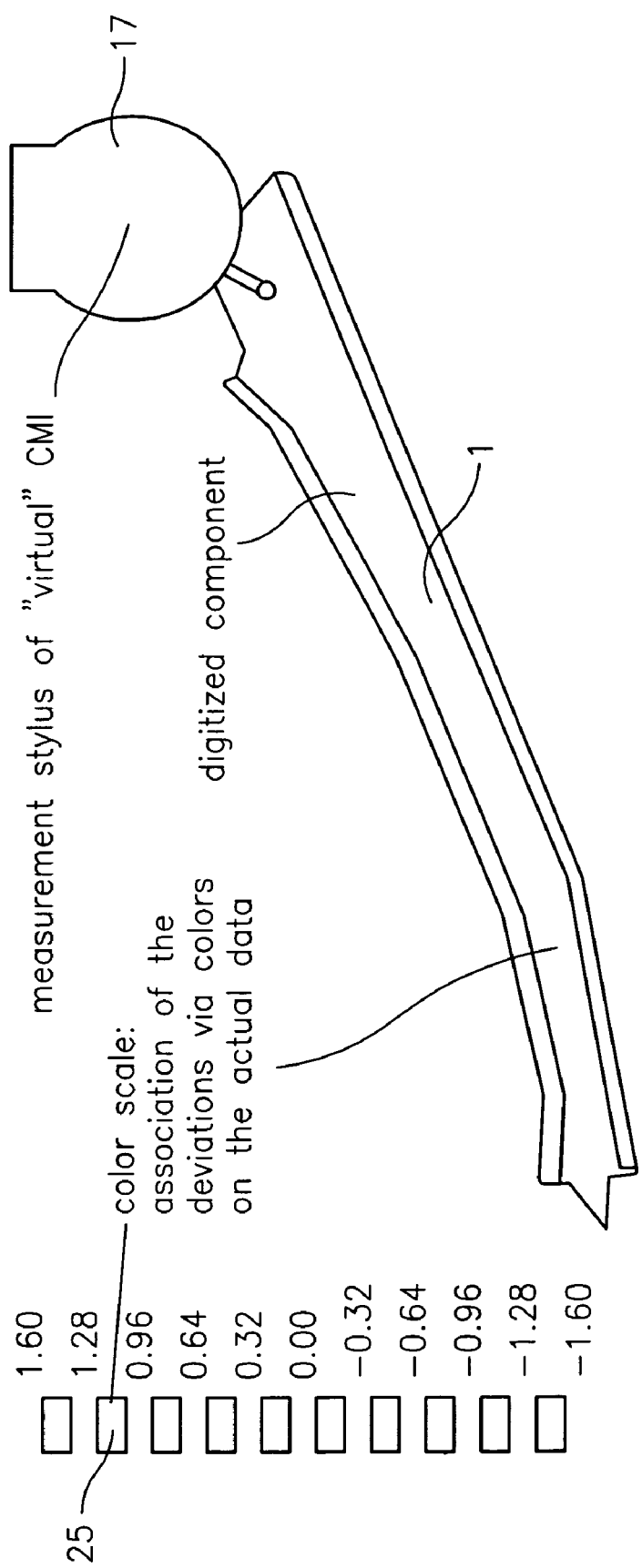
FIG. 6 shows a schematic representation of the method of the invention.

FIG. 6 shows an enlarged representation of the image 9 of FIG. 1. The measurement program 24 for a coordinate measuring instrument generates a virtual measuring stylus 17 of a virtual coordinate measuring instrument, which surveys the virtual digitized component 1. The results of this measurement are compared with the scheduled data. The deviations are represented by a color scale 25, in which different colors each are associated to different deviations.

This invention provides for realizing a method and an apparatus for the virtual survey and inspection of digitized data. By means of the invention, the survey of a digitized component by means of a coordinate measuring instrument becomes possible in a software without a physical coordinate measuring instrument, whereby the process of the survey and inspection with tactile coordinate measuring instruments (coordinate measuring machines), which presently is employed a million times worldwide, can be adapted for the optical measurement technique, in order to combine the advantages of both worlds, i.e. the advantages of the tactile measurement technique and the optical measurement technique. By means of the invention, various advantages can be achieved, namely:

the procedures for creating a measurement program can be maintained as usual; merely the kind of survey is changed (tactile, optical, etc.);

already existing programs for coordinate measuring instruments can still be used;

the method can be performed independent of the hardware of a specific coordinate measuring instrument; this means that it is not required to check whether the measuring stylus of the coordinate measuring instrument collides with the component;

with regard to the advantages of the optical measurement technique and its increasing acceptance, costs can be saved; in particular, a high throughput is possible by using the optical measurement technique; furthermore, it is possible to not only perform a random control, but a 100% control;

the optical measurement technique and the tactile measurement technique can equally be operated in parallel and with the same procedures; this means that the same measurement programs can be applied both to coordinate measuring instruments and to instruments optically measuring the data, whereby a fully automatic inspection process becomes possible.

The simulation of the measurement by a coordinate measuring instrument can be represented on a screen, as shown in FIGS. 5 and 6. The final results, i.e. deviations of the actual measurement values from the scheduled data, can be represented directly, for instance by colors.

This invention provides for realizing a method and an apparatus for the survey and inspection of digitized data, namely actual measurement data, which are characterized in that the measurement of the actual measurement data virtually is effected on a computer with a software and thereby a physical coordinate measuring instrument is simulated. The actual measurement data can be optically scanned data, radiometrically scanned data (e.g. CT data) or data scanned in a tactile way. The actual measurement data can be individual or a plurality of Cartesian points (e.g. a 3D aggregate of points) or cross-linked Cartesian points (e.g. triangulation systems) or individual scan lines of sequential Cartesian points. The measurement of the actual measurement data can interactively be performed on the screen or automatically. For automation of the survey of the actual measurement data, the standardized data format "DMIS" and/or the standardized data format "I++DME" can be used. For automation of the survey of the actual measurement data, proprietary coordinate measuring instrument programs and their data formats can be used. Furthermore, proprietary manufacturer-specific data formats can be used, in particular the proprietary data formats "VW measurement schedule", "Audi measurement schedule" and/or "BMW measurement schedule". The result of the virtual coordinate measuring instrument survey of the actual measurement data can be output on a screen and/or be output into a file for further processing. For inspection, the result of the virtual coordinate measuring instrument survey of the actual measurement data can directly be compared against scheduled data. The results of the inspection can be represented in the form of tables and/or graphically. They can be written into a file for further processing.

The invention claimed is:

1. A method for surveying actual measurement data of a component, comprising the steps of:
  performing an optical scan of the component to obtain actual measurement data,
  storing the actual measurement data in a memory, and surveying the actual measurement data of the component by a measurement program for a tactile coordinate measuring instrument, comprising the steps of:

retrieving by the measurement program the actual measurement data from the memory, generating a virtual digitized component from the actual measurement data, generating a virtual measuring stylus of a virtual coordinate measuring instrument, and surveying by the virtual measuring stylus the virtual digitized component generated from the actual measurement data of the component, wherein the surveying includes selecting characteristics of the component to be surveyed.

2. The method according to claim 1, wherein the actual measurement data of the component are obtained by an optical scan.

3. The method according to claim 1, wherein the actual measurement data are present or obtained as an aggregate of points, as cross-linked Cartesian points and/or as scan lines.

4. The method according to claim 1, wherein the actual measurement data are surveyed interactively.

5. The method according to claim 1, wherein the actual measurement data are surveyed automatically.

6. The method according to claim 1, wherein the actual measurement data are surveyed by a standardized data format.

7. The method according to claim 1, wherein the measurement results are output on a screen.

8. The method according to claim 1, wherein the measurement results are output into a file.

9. The method according to claim 1, wherein the measurement results are compared with scheduled data.

10. The method according to claim 9, wherein the comparison results are output in the form of a table and/or graphically.

11. The method according to claim 9, wherein the comparison results are output on a screen.

12. The method according to claim 9, wherein the comparison results are output into a file.

13. An apparatus for surveying actual measurement data of a component, comprising an optical scanning device for obtaining the actual measurement data of the component, and a data processing unit, in which a measurement program of a tactile coordinate measuring instrument is included for generating a virtual measuring stylus of a virtual coordinate measuring instrument and for surveying the actual measurement data using the virtual measuring stylus, wherein the surveying includes selecting characteristics of the component to be surveyed.

14. The apparatus according to claim 13, wherein the optical scanning device is a scanner.

15. The apparatus according to claim 13, wherein in the data processing device a comparison program is included for comparing the results of the measurement program with scheduled data.

16. The apparatus according to claim 13, comprising a screen for outputting the measurement results and/or the comparison results.

17. The apparatus according to claim 14, wherein in the data processing device a comparison program is included for comparing the results of the measurement program with scheduled data.

18. The apparatus according to claim 17, comprising a screen for outputting the measurement results and/or the comparison results.

19. The apparatus according to claim 15, comprising a screen for outputting the measurement results and/or the comparison results.

20. The apparatus according to claim 14, comprising a screen for outputting the measurement results and/or the comparison results.

* * * * *